June 22, 1937.  E. M. DAVIS  2,084,894
DEODORIZER
Original Filed Dec. 29, 1934  2 Sheets-Sheet 1

Elmer M. Davis
INVENTOR

WITNESS -

BY
ATTORNEY

June 22, 1937.  E. M. DAVIS  2,084,894
DEODORIZER
Original Filed Dec. 29, 1934   2 Sheets-Sheet 2

ATTEST-
Wm C. Meiser

Elmer M. Davis
INVENTOR

BY
ATTORNEY

Patented June 22, 1937

2,084,894

UNITED STATES PATENT OFFICE 2,084,894

DEODORIZER

Elmer M. Davis, Chicago, Ill., assignor to Industrial Patents Corporation, Chicago, Ill., a corporation of Delaware Original application December 29, 1934, Serial No. 759,623. Divided and this application April 27, 1935, Serial No. 18,628

3 Claims. (Cl. 31—2)

This invention relates to a device for deodorizing milk and cream.

This application is a division of my application entitled, "Deodorizer and method of deodorizing," filed December 29, 1934, Serial No. 759,623.

One of the objects of the invention is to provide a device for removing objectionable odors from cream.

Another object of the invention is to provide a device for removing onion odors and flavors from cream.

Another object of the invention is to provide a device of simple construction for the treatment of cream with live steam.

Other objects of the invention will be apparent from the description and claims which follow.

During portions of the pasturing season large quantities of cream are received at creameries from which an inferior grade of butter is produced due to flavors and odors derived from onions, strong grasses, weeds and the like consumed by the cows. Careless handling, improper storage and the like also result in the development of unpleasant, undesirable flavors and odors in cream, many of which are carried over into the butter churned from the cream.

The invention may be better understood by reference to the accompanying drawings in which similar reference characters in the figures identify similar parts.

Figures 1, 2:
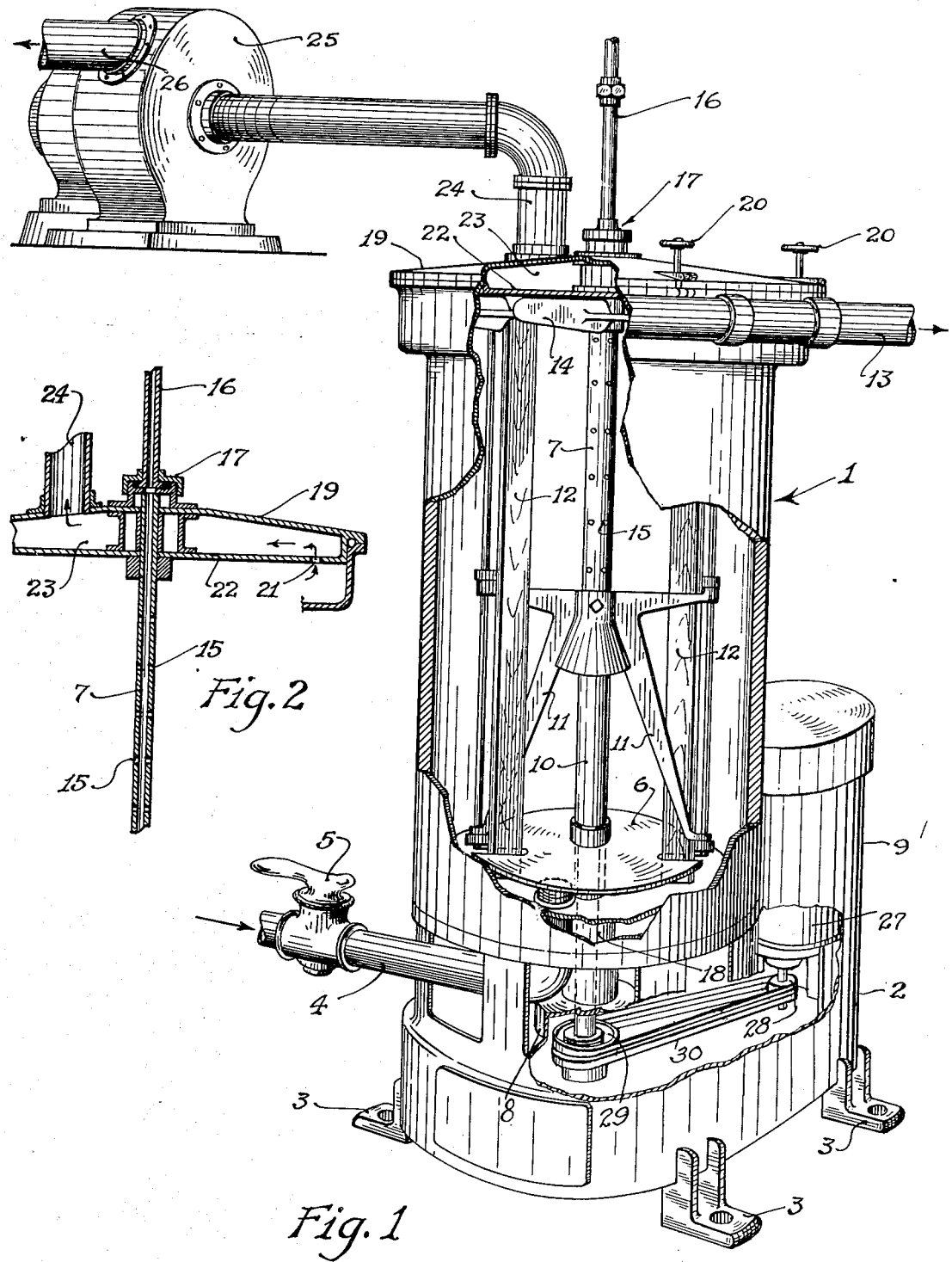
Figure 1 is a perspective view of a preferred embodiment of the device of the present application.
Figure 2 is a sectional detail view of the top of the deodorizing device shown in Figure 1.
Figure 3:
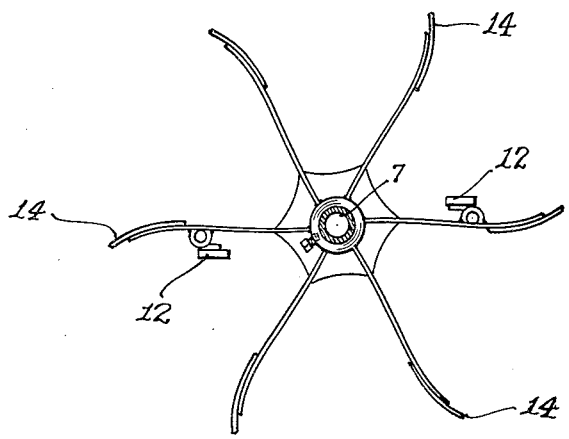
Figure 3 is a plan view partly in section of the blades designated in Figure 1 by the numeral 14.
Figure 4:
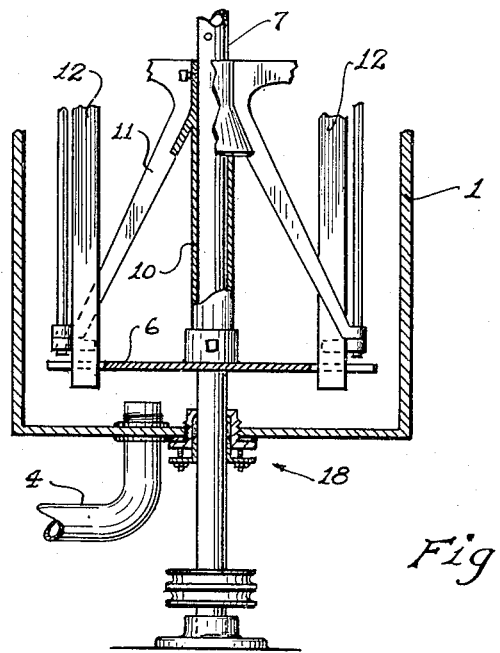
Figure 4 is a cross-sectional view at the lower end of the apparatus shown in Figure 1.

Deodorizer 1 is mounted upon housing 2 supported by feet 3. Cream at pasteurizing temperature is admitted to deodorizer 1 through line 4 provided with valve 5. The cream enters under pressure and impinges against baffle plate 6. Shaft 7 is driven through gear box 8 by power transmitted from motor 27 through the medium of pulleys 28 and 29 and belts 30. Motor 27 is suitably mounted in the portion 9 of the housing 2. Dasher sleeve 10 is mounted upon and rotates with shaft 7. Dasher arms 11 affixed to dasher sleeve 10 carry dasher blades 12 which in operation cause the liquid to be swirled upwardly and driven out through line 13 by impeller blades 14 which are also mounted upon shaft 7 and rotate therewith.

As will be seen by reference to Figure 2, shaft 7, which is hollow, is provided with a plurality of holes 15 through which jets of steam are directed toward the inside wall of deodorizer 1 to treat the film of cream swirling upwardly thereon when the device is in operation. Steam is admitted to shaft 7 through line 16 from a source not shown. The steam enters at packing gland 17. It will be understood, of course, that a packing gland is also provided at 18.

Deodorizer 1 is provided with a cover 19 which may be fixed to the top of deodorizer 1 as by screws 20. Steam and odors escape from the deodorizer 1 through a plurality of holes 21 in the lower plate 22 of cover 19 and pass from chamber 23 through line 24, exhaust fan 25 and line 26 to the outer atmosphere.

The device of the present invention provides an unusually efficacious apparatus which is inexpensive to construct and simple in operation, being dependent for its success upon the direct impingement of live steam upon a moving film of cream and not upon the use of unusual pressures or of a vacuum.

The device of the present application may be used to entirely deodorize cream tainted with numerous types of odors and may be used as auxiliary to other deodorizing methods in the case of odors which are extremely tenacious and difficult to dissipate.

I claim:

1. A deodorizer comprising a chamber, a rotatable shaft in said chamber, a baffle plate, means for impinging fluid against said baffle plate, an agitator rotatable with said shaft and a steam line leading to said shaft, said shaft being hollow through a portion of its length and provided with a plurality of holes.

2. A deodorizer for cream comprising a chamber, a rotatable shaft in said chamber, a baffle plate, means for impinging cream against said baffle plate, an agitator rotatable with said shaft and a steam line leading to said shaft, said shaft being hollow through a portion of its length and provided with a plurality of holes, exhaust means for said cream and separate exhaust means for steam and gases separated from the cream.

3. In combination, a deodorizer comprising a cylindrical chamber, a rotatable hollow shaft mounted in said chamber, a dasher sleeve mounted upon said shaft, a baffle plate mounted on the lower portion of said chamber, a cream inlet line below said baffle plate, dasher arms mounted upon said dasher sleeve, dasher blades mounted upon said dasher arms, impeller blades mounted upon said shaft near the top of said chamber, a pipe for the escape of cream in the plane of said impeller blades, a cover for said chamber, said cover being provided with a gas exhaust chamber, a steam line leading into said shaft, said shaft being provided with a plurality of holes for the admission of steam, means for driving said shaft, said cover being provided with a plurality of holes leading from said chamber to said exhaust chamber, and an exhaust line leading from said exhaust chamber, with a fan in said exhaust line and means for securing said cover to the chamber in closed position.

ELMER M. DAVIS.